Figure 1:
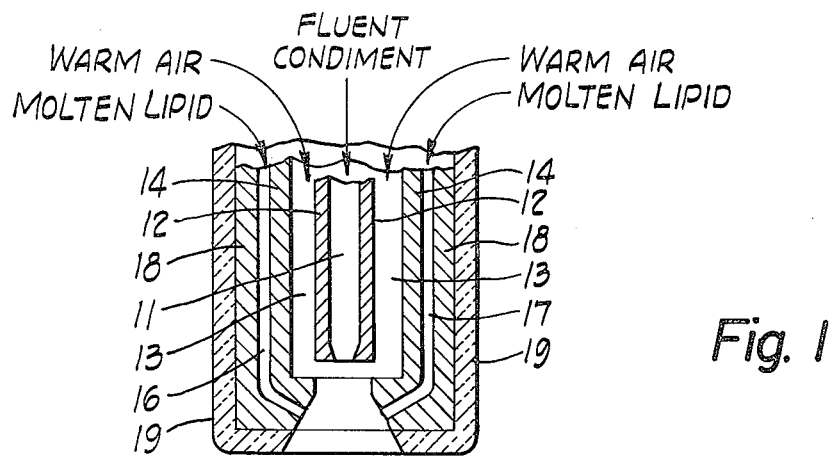
Figure 2:
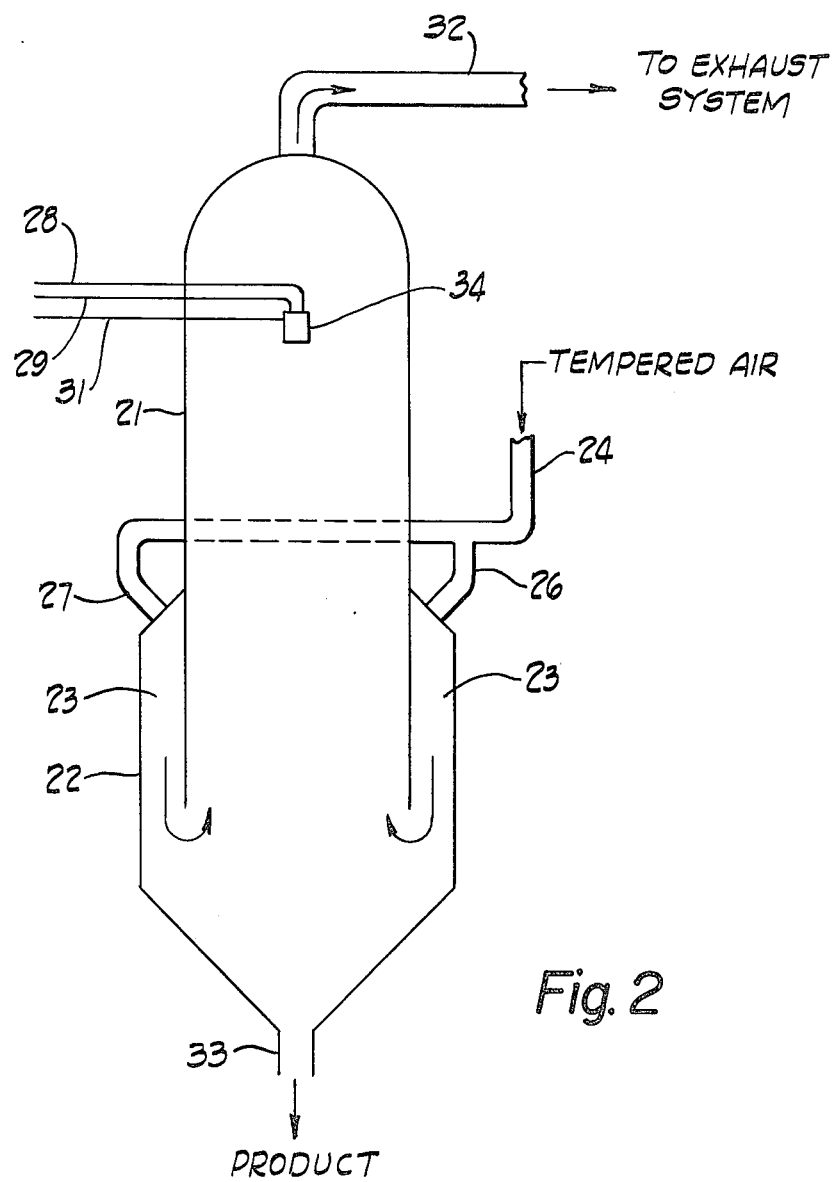

United States Patent [19]
Johnson et al.

[11] 3,949,094
[45] Apr. 6, 1976

[54] CONDIMENT-TREATING PROCESS AND PRODUCT

[75] Inventors: Lawrence A. Johnson, Medina, Ohio; Edgar J. Beyn, Annapolis, Md.

[73] Assignee: SCM Corporation, New York, N.Y.

[22] Filed: July 31, 1974

[21] Appl. No.: 493,324

[52] U.S. Cl. .................. 426/99; 426/471; 426/651
[51] Int. Cl.² ........................................ A23L 1/22
[58] Field of Search .......... 426/89, 96, 98, 99, 194, 426/201, 221, 223, 362, 369, 471, 601, 650, 651

[56] References Cited
UNITED STATES PATENTS

| | | | |
|---|---|---|---|
| 2,785,983 | 3/1957 | McMath | 426/99 |
| 3,389,000 | 6/1968 | Fujita et al. | 426/99 |
| 3,432,307 | 3/1969 | Ginneken et al. | 426/189 X |
| 3,647,480 | 3/1972 | Cermak | 426/362 X |
| 3,796,814 | 3/1974 | Cermak | 426/147 X |

Primary Examiner—A. Louis Monacell
Assistant Examiner—Esther L. Massung
Attorney, Agent, or Firm—Jerry K. Mueller, Jr.

[57] ABSTRACT

Condiments such as flavorings, seasonings, colorants, flavor enhancers and the like are coated by readily-congealable lipoidal material such as fat by the instant improved spray chilling process to give unique composite products.

10 Claims, 2 Drawing Figures

U.S. Patent   April 6, 1976   3,949,094

CONDIMENT-TREATING PROCESS AND PRODUCT

This invention relates to an improvement in process for producing lipid-coated condiment, and more particularly to such process wherein spray chilling is employed for congealing the lipid.

A condiment for purposes of this invention can be a liquid, vapor, or solid phase seasoning, flavoring, salting, sweetening, souring, spicing, and/or coloring ingredient or ingredient mixture suitable for producing or enhancing a flavor, texture and/or color in an edible product. It can include or consist of single or mixed pungent or spicy solids, flavoring oils, essences, oleoresins, extracts and other zesty flavorings, for example oleoresin of ginger, oils or extracts or solid forms of sage, pimenta, coriander, parsley, garlic, caraway, nutmeg, cardamom, cloves, celery, etc. It also can include or consist of: edible titanium dioxide in permissible amounts, especially those treated in accordance with U.S. Pat. Nos. 3,592,940 and 3,579,356; monosodium glutamate; frequently sticky or liquid or semi-liquid food emulsifiers or blends thereof, especially those blended with normally solid lipids, such as one or more alkoxylated partial glycerides of edible fatty acids, lecithin, hydroxylated lecithin, alkoxylated and plain glycol esters of edible fatty acids optionally ethoxylated, sorbitol or sorbitan esters of fatty acids optionally ethoxylated, etc.; food emulsifiers in salt form such as calcium stearyl lactylic acid; edible gums, stabilizers, and other food ingredients such as gelatin, soy protein, sodium carboxymethyl cellulose, edible " microcrystalline" cellulose, baking powder, hydroxypropyl cellulose, dextrose, sucrose, saccharin, hydrolyzed cereal solids, cornstarch, wheat flour, rice flour, breadcrumbs, triglyceride fats (normally liquid, plastic or solid), and the like; and mixtures of the same. If the condiment is highly volatile, or liquid, or normally vaporous, it can be blended with lipoidal material such as a hard fat and processed (under superatmospheric pressure where necessary or desirable) to retain it for handling and conversion into particulates.

A number of techniques and products have been proposed for retaining condiments in a fatty matrix such as hard fat. Perhaps the art most pertinent to the present invention is represented by U.S. Pat. No. 3,084,050, which teaches spraying shortening onto dextrose crystals, then further blending the sugarfat mixture with starch, TiO$_2$, etc. Other art representative of the desire to compound condiments with a fatty matrix include U.S. Pat. Nos. 2,785,983 (wherein a flavoring oil such as capsicum is dissolved in molten fat and the solution is spray chilled in the form of droplets), 3,647,480 (wherein salt, flavorants or the like are tumbled with beaded fat until enrobing ensues), 3,582,353 (wherein flavoring is dispersed and/or dissolved in molten fat, then the fat chilled and flaked), and 2,694,643 (wherein a fatty aqueous emulsion with sweetner is spray dried). The disclosure of these patents is incorporated herein by reference and they are included in the prior art list submitted herewith.

Advantages of this improvement over prior proposals include the fact that it is a flow (continous) process rather than a batch process, yet it has even more flexibility and adaptability to a variety of condiment treatments than heretofore envisioned. Additionally, it is especially efficient with respect to its employment of lipoidal material, and it can be operated to make a quite wide range of particles, and to encapsulate even condiments generally unsatisfactory or only marginally satisfactory for the chilling processes of U.S. Pat. Nos. 2,785,983, 3,796,814, and 3,582,353 (condiments tending to swell in humid air such as wheat flour and vegetable protein).

The instant improvement in a process for encapsulation of condiment with normally solid lipoidal material comprises: liquifying the condiment; spraying the resulting liquified condiment as a spray pattern of particles; intercepting said spray pattern with a spray of said lipoidal material in fluent state directed for enveloping condiment-rich spray particles; passing resulting enveloped particles into a chilling zone; and therein congealing at least their lipoidal exterior.

The resulting composite product of this process has a condiment-rich core and a congealed lipoidal material-rich coating thereon. The distribution of particle sizes is characteristic of conventional spraying.

FIG. 1 shows a useful nozzle tip assembly in cross-sectional elevation. The fluent condiment flows through passage 11, which passage is defined by tube wall 12. Annular to tube wall 12 is passage 13 conveying warm air transverse to the jet of fluent condiment exiting from passage 11 and atomizing this jet. Annular passage 13 is defined by tube wall 12 and the inner wall of interior casing 14.

A pair of peripheral passages 16 and 17 (180° opposed and small in diameter) convey the molten lipid through exterior casing 18 and discharge it as a spray into the zone of atomized condiment. There can be additional such peripheral passages, generally opposed to each other and tending to intersect if unimpeded into a conical pattern looking down, but when the nozzle is in full operation, the molten enveloping lipid is atomized quite thoroughly and additional such streams of molten lipid tend to make more perfect lipid coatings on the core particle rich in condiment. Lagging 19 insulates the nozzle assembly from substantial heat loss. Obviously, more than one kind of lipoidal material can be used for the coating spray, each projected from a different spraying outlet.

FIG. 2 shows a typical spray chiller schematically in vertical cross-section elevation. Shell 21 (the chilling zone) is a vertical cylindrical body extending into base 22. Tempered air (typically 40°F. and 40–80% relative humidity) enters line 24, is manifolded to inlets 26 and 27, and flows into annulus 23 formed by the downward extension of shell 21 and the wall of base 22. Liquified condiment enters the apparatus through line 28 along with a flow of warm air through line 29 and molten enveloping lipid through line 31. These are discharged downwardly into shell 21 through nozzle 34, typically a nozzle like that shown in FIG. 1.

The spray of lipid-coated condiment congeals as it falls countercurrently through the rising flow of cool air. Finished particles of the encapsulated condiment product are discharged through outlet 33 in base 22 and fall into a lock hopper (not shown). Spent air and entrained fines pass through overhead discharge line 32 to an exhaust system (not shown). Such exhaust system generally comprises a cyclone separator for a collection of particulates and even can be followed by a bag filter or like solid separation collector for additional recovery of undersized values. Additionally, the finished particles can be cooled further by cold gas fluidization.

The spray chiller can be operated under superatmospheric or subatmospheric pressure, although atmospheric pressure whenever feasible is preferred for efficiency and economy.

The lipoidal material is an edible vegetable fat, animal fat, so called "low molecular" fats, free higher ($C_{12-26}$) fatty acids, and/or a fatty food emulsifier such as a monoglyceride, diglyceride or a partial glycolate of fatty-forming ($C_{12-26}$) fatty acids, glycerol mixed esters of water soluble hydroxy carboxylic and higher fatty acids, polyoxyalkylene derivatives of sorbitan ester of higher fatty acids, glycol esters of higher fatty acids and their polyoxyalkylene derivatives, higher fatty acid esters of polyglycerols and their polyoxyalkylene derivatives, tartaric acid esters of higher fatty acid monoglycerides, stearyl monoglyceridyl citrate, higher fatty acid esters of citric acid such as dipalmityl or distearyl citrate, sucrose esters of higher fatty acids, alkoxylated partial higher fatty esters of polyhydric alcohols having from 2 to 6 carbon atoms, and mixtures of same. Thus, lipoidal material for the instant purpose includes triglycerides, fatty emulsifiers, and mixtures of same.

Additives which can be included as a fraction (typically a very minor fraction) of the lipoidal material (the core, the coatings, or both) include fungistats, bacteriostats, silicone oil, tints, dyes, colorants, flavorants, odorants, and antioxidants. Occasionally a tinted or variegated coating is desirable over the core. When incorporating such additives into the lipoidal material, they generally are proportioned in useful ratios for their end purposes. Thus, for example, one can use in a typical formulation 1 to 30% (by weight of the lipoidal material) of a food-approved colorant to yield the desired color in the encapsulated condiment particles.

By a normally solid lipoidal material (including a mixture of lipoidal materials) is meant that such material at 90°F., advantageously at 95°F., and preferably at about 115°–180°F., is ostensibly dry to the touch, free-flowing in small (e.g. 60–100 mesh) beaded form, and such beads do not tend to agglomerate strongly or appreciably or to deform appreciably even when standing unpacked to a depth of 6 inches high in a one-inch diameter cylinder for 24 hours at 75°–80°F.

In practicing this invention, the first step is to "liquify" the condiment which is to be encapsulated. An already normally liquid condiment can be sprayed (atomized) in its liquid form for purposes of this step. A vaporous condiment to be encapsulated is best dissolved or sorbed into a fluent high-boiling matrix, particularly a congealable hard fat like that used to envelop the core spray particles. Alternatively, such condiment can be sorbed on an edible solid and handled like a solid condiment. Certain solid condiments being encapsulated can be melted in order to spray the condiment, provided that the desired organoleptic characteristics of such condiment are not grossly damaged by said melting. Alternatively and preferably however, solid and most liquid condiments to be encapsulated can be liquified by dispersing them in finely divided state or dissolving them in a sprayable lipoidal matrix that is congealable in the chilling operation, for example a molten normally hard fat, for efficiency and economy.

Liquification for the instant purpose means then coverting (by melting, sorbing, dissolving or suspending) the condiment in such form that it can be atomized by conventional means, for example airless spray, gas-assisted spray, spinning disc, or the like. Average particle size (diameter) for spraying can be as low as a few microns on up to 100 microns or even larger. While certain product particles preferably are at about 5 microns (average), many condiment products in our resulting spray-chilled form are advantageously about 80–90 microns average diameter. Thus, the atomizing nozzles used are made to produce such size, and solids used are, of course, fine enough to preclude nozzle stoppage. Frequently it is desirable to spray the enveloping lipoidal material onto the core of condiment-rich particles at a temperature substantially above that of the initially liquified core spray for purposes of rendering such enveloping lipid the more fluent for great flowability and covering ability.

The spray pattern of condiment particles is intercepted with a spray of the lipoidal material in fluent state directed for enveloping the condiment-rich spray of particles. The multispray pattern usually is formed by use of a multicomponent spray nozzle. The resulting enveloped particles thereupon pass into a chilling zone, therein congealing at least their lipoidal exterior. Such congealing preferably is accomplished by heat transfer to cool air. However, any suitable cooling means can be utilized according to the precepts of this invention. The cool air preferably can pass countercurrently to the enveloped particles in said chilling zone for efficiency and economy. However, when the final particle size (effective diameter) becomes as small as 5–50 microns, a cocurrent chilling stream is preferred because the particles are in the fine particulate form that can be carried along well in a medium velocity stream of air. Thus, the cooling gas stream can be countercurrent, cocurrent, or cross-current to the spray particles as is necessary or desirable (e.g. to resist or promote classification).

The size (effective diameter) of the encapsulated condiment particles and the proportion of condiment to lipids therein can be varied over a wide range and are dependant upon the condiment spray particles sizes and the flow rates of the streams. Final encapsulated particle sizes will range from about 5 microns or smaller to 150 microns or larger. The weight proportion of total lipid to condiment in the encapsulated particles ordinarily will range from about 100:1 to about 0.1:1 depending upon the intended usage of the encapsulated particles. The size of and the condiment content in the encapsulated particles each can be varied over the above ranges to produce particles of the desired size and condiment content, and particles can be classified as to size after production for particular use.

The enveloped particles of the instant process will have a condiment-rich core and a congealed lipoidal material-rich coating thereon. The condiment-rich core is afforded a measure of protection by the congealed lipoidal coating against deterioration caused by exposure to the atmosphere; swelling of the condiment from exposure to moisture such as humid air and possible resulting cracking of the product particle; prevention of undesired interaction between condiment and its surrounding materials in a food, drug, or cosmetic (e.g. yeast inhibition by cinnamon or like spices in a dough); the control for release of the condiment into a foodstuff or the like in which it is compounded, the lipoidal exterior melting to release the condiment at a desired rather than accidental juncture; and prevention of a condiment coloring ingredient and/or flavoring to bleach, run, dilute or evaporate.

The condiment for the core can be readily hydratable upon exposure to air, or it can be a fugitive substance (readily volatile), or other condiment not now generally conventionally encapsulated well by simple beading. The amount of such protection is dependent upon the specific lipoidal material chosen, the coating thickness, and the completeness of coating of such lipoidal material enveloping the condiment core. Ordinarily, there will be very little or no condiment at the surface of the encapsulated particles, but even an incomplete coating is often adequate for many uses of the particles. The resulting product particles, of course, can be fluidized or otherwise suspended in a gas carrier or tumbled for further coating with lipoidal, sacchariferous, proteinaceous, resinous or other coating material, glaze etc.

The condiment core can consist of sugar (sucrose or a mixture of sucrose and other solids). Encapsulated sugar particles produced according to the instant process are suitable for use as a portion of the coating mixture of an inventive coconut product and a particulate sweetener replacement for straight powdered sugar in foods as disclosed by Johnson et al. (disclosure I-2096) U.S. Ser. No. 475,623. Said reference application relates to an improved sweetened coconut product coated with powdered sugar coating that is made by substituting particles of sugar encapsulated in edible fatty material for a fraction of the straight powdered sugar.

The condiment core also can consist of baking powder or other suitable leavening agents. Encapsulated baking powder particles produced according to the instant process are suitable for use in frozen or refrigerated batters and doughs, various dry culinary mixes, and the like.

It should be noted that fines emanating from the spray pattern of condiment particles, generally such fines being most prominent at the periphery of such spray pattern, can be collected and aggregated into larger, more desirable sized particles by the spray of surface coating dispersion as it intersects the condiment spray. Such fines collection process is disclosed by the following application filed on even date herewith: Edgar J. Beyn docket number I-2106, Ser. No. 493,323, entitled "Equipment and Process for Spray Drying", which disclosure is expressly incorporated herein by reference.

Coating of the spray of condiment particles by the spray of surface coating dispersion can be improved additionally by subjecting each such spray to an equal but opposite electrostatic charge (for example, a positive charge to the condiment spray particles and a negative charge to the surface coating spray particles). Such oppositely charged spray particles would tend to be attracted to each other to further promote encapsulation of the condiment spray particles by the surface coating spray particles, especially if the condiment spray has a relatively higher surface tension that the surface coating dispersion has. U.S. Pat. No. 3,208,951 discloses such a method of encapsulation of a liquid (for example, water, glycerine or ethylene glycol) in aerosol form by an encapsulating substance (for example, a wax or synthetic resin) wherein the two sprays are given equal, but opposite electrostatic charges to produce 10–60 micron encapsulated particles. The disclosure of said reference is expressly incorporated herein by reference.

The present invention will be better understood by reference to the following example which is provided as a mere illustration and should not be construed as a limitation. In this specification all temperatures are in degrees Fahrenheit, all mesh sizes are of the United States Standard Sieve Series, and all parts and percentages are by weight unless otherwise specifically noted.

EXAMPLE

Referring to FIG. 2, a molten blend of 10% five-fold orange oil and 90% of triglyceride fat (specification C.M.P. of 124°–130°) is introduced through line 28 at the rate of 100 milliliters per minute and temperature of 145°. Three SCFM (measured at 760 mm. Hg and 70°) of air at 145° passes through line 29. Molten triglyceride fat at 170° (of the same type as fed into line 28) passes through line 31 at the rate of 40 milliters per minute as the coating lipid. These liquid flows are atomized in nozzle 34, said nozzle having a tip like that described in connection with FIG. 1, but having four peripheral jets for the coating lipid. The net spray is directed downwardly and countercurrently to a flow of tempered air (18 SCFM at essentially atmospheric pressure, 40° and 80% relative humidity), entering line 24, passing through lines 26 and 27, annulus 23, and eventually shell 21 which is at about atmospheric pressure. Chilled, congealed product, about 80 mesh average particle size, collects in the bottom of base 22 and is withdrawn through outlet 33. It is appreciably coated with congealed triglyceride fat enrobing a core rich in orange oil. An exhaust of the spent air containing any ultrafine particles is withdrawn from shell 21 through line 32 and discharged to a particle-collecting exhaust system comprising a cyclone separator in series with a bag filter.

We claim:

1. A process for encapsulation of condiment with normally solid lipoidal material, which comprises:

providing said condiment in liquified form, spraying the resulting liquified condiment as a spray pattern;

intercepting said spray pattern with a spray of said lipoidal material in a fluent state directed for enveloping said condiment spray pattern;

passing resulting enveloped particles into a chilling zone; and therein congealing at least their lipoidal exterior.

2. The process of claim 1 wherein said lipoidal material comprises triglyceride fat.

3. The process of claim 1 wherein said lipoidal material comprises a food emulsifier.

4. The process of claim 1 wherein said condiment is liquified by dispersing it in a fluent, atomizable lipoidal matrix.

5. The process of claim 1 wherein said spraying of said liquified condiment is assisted with a flow of warm gas.

6. The process of claim 1 wherein the said enveloped particles pass substantially countercurrently to a flow of chilling gas in said chilling zone and are collected near the base thereof.

7. The process of claim 1 wherein the enveloped particles pass substantially cocurrently with a flow of chilling gas in said chilling zone and are separated as product from the resulting spent gas.

8. The product of the process of claim 1 having a condiment-rich core and a congealed lipoidal material-rich coating thereon, and said core is a lipoidal matrix comprising said condiment.

9. The product of claim 8 wherein said condiment is readily hydratable upon exposure to air.

10. The product of claim 8 wherein said condiment includes fugitive substance.

* * * * *